Figure 1:
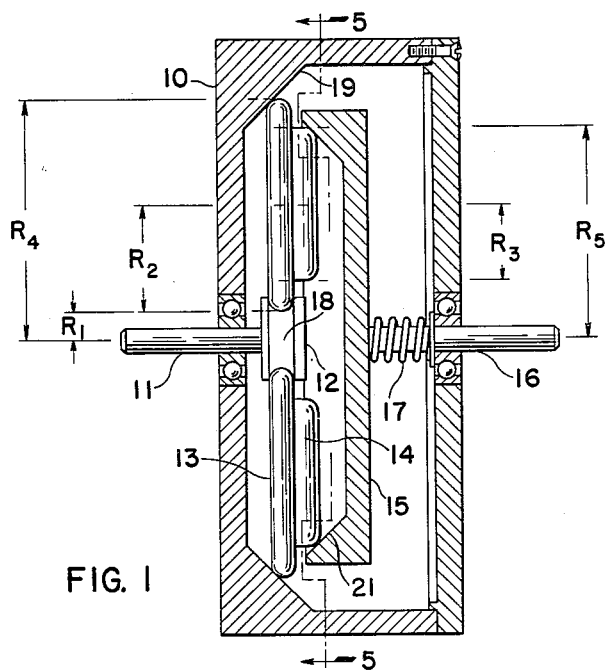

May 15, 1956 M. V. BRAUNAGEL ET AL 2,745,298
ANTI-BACKLASH POWER TRANSMISSION
Filed June 9, 1953 2 Sheets-Sheet 1

INVENTORS
MAGNUS V. BRAUNAGEL
ROBERT L. SHELLEY
BY
ATTORNEYS

May 15, 1956 M. V. BRAUNAGEL ET AL 2,745,298
ANTI-BACKLASH POWER TRANSMISSION
Filed June 9, 1953 2 Sheets-Sheet 2

*INVENTORS*
MAGNUS V. BRAUNAGEL
BY ROBERT L. SHELLEY
ATTORNEYS

United States Patent Office 2,745,298
Patented May 15, 1956

2,745,298

ANTI-BACKLASH POWER TRANSMISSION

Magnus V. Braunagel and Robert L. Shelley,
Indianapolis, Ind.

Application June 9, 1953, Serial No. 360,625

1 Claim. (Cl. 74—798)

(Granted under Title 35, U. S. Code (1952), sec. 266)

The invention described herein may be manufactured and used by or for the Government of the United States of America for governmental purposes without the payment of any royalties thereon or therefor.

This invention relates to a power transmission device, more specifically to a power transmission device constructed to avoid problems of backlash. Such power transmission devices are particularly desirable in small installations such as instrument servo-mechanisms or in any installation where the transmitted power requirements are small and it is important to have the power transmission uninterrupted by any lost motion in the transmitting system, i. e. there is no backlash in the power transmitting linkage.

In previous constructions of devices of this type, resort has been made to elaborate spring and gearing, usually coupled with the requirement of precision cut gears. Such systems have the disadvantages that the gearing must be precision cut, which is time consuming and expensive, and/or elaborate systems of springs and gearing must be devised and added to the power transmission for backlash compensation. Such arrangements require considerable space and therefore do not lend themselves to compact packaging and the additional structure necessary to accomplish the compensation for backlash and wear in many cases introduces inertia factors which are a large percentage of the total inertia of the system. A further disadvantage is that when the gear system is made with close tolerances to avoid backlash, the system becomes temperature sensitive.

The present invention has among its objects the provision of a power transmission system from which backlash has been eliminated.

Another object of the present invention is to provide a power transmission system which automatically compensates for wear.

Another object of the present invention is to provide a power transmission system in which the required degree of accuracy may be obtained from metal stampings.

Other objects and features of the invention will become apparent to those skilled in the art as the disclosure is made in the following detailed description of a preferred embodiment of the invention.

The present invention avoids or overcomes the above described disadvantages, first, by relying on a frictional engagement between the rotating members of the system to transmit the power, and, secondly, by employing beveled surfaces for the engagement with spring pressure to accomplish the engagement. Such a system is self compensating for wear and for temperature changes. The use of the beveled surfaces also enables the present invention to achieve the required degree of precision with the use of metal stampings, which facilitate manufacture and greatly reduces the mass of the system.

Figure 5:
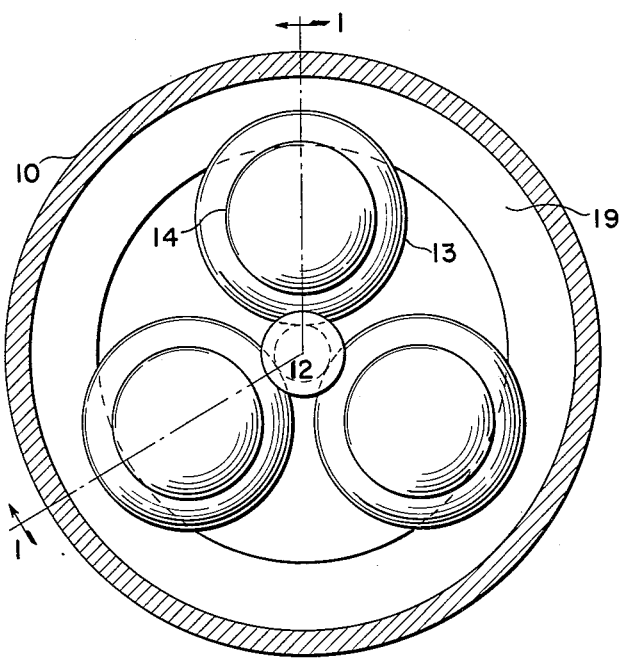
Figure 2:
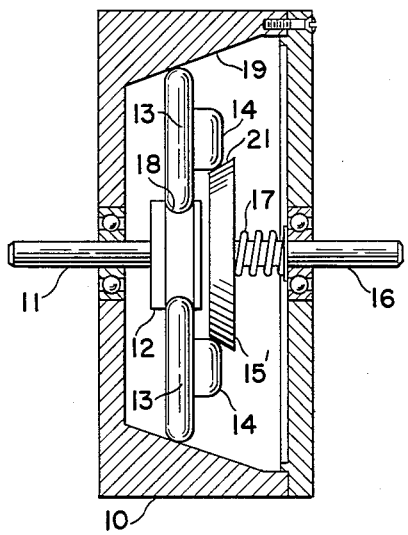
Figure 3:
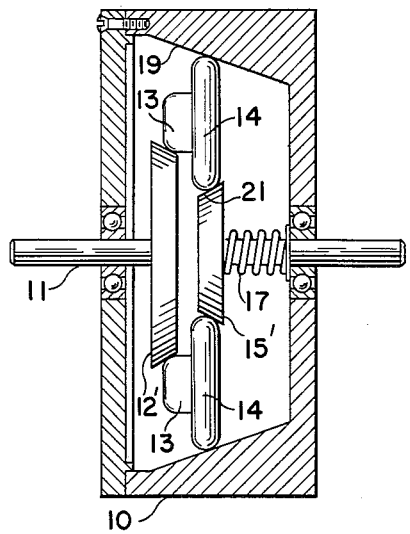
Figure 4:
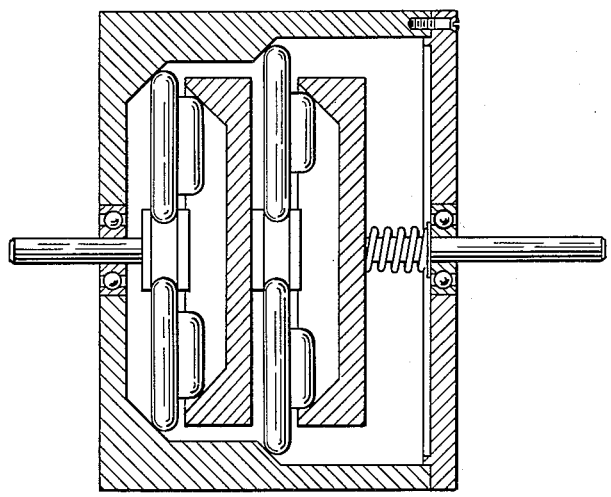

The nature of the invention may be more fully understood from a consideration of the following description in connection with the accompanying drawings, in which:

Fig. 1 is a cross sectional view of the power transmission device of the present invention, Fig. 2 is a cross sectional view of a modified form of the present invention, Fig. 3 is a cross sectional view of a second modification of the present invention, Fig. 4 is a cross sectional view of a cascaded arrangement of the present invention, and Fig. 5 is a sectional plan view.

Fig. 1 is an embodiment of the invention having a housing 10 in which are rotatably mounted in axial alignment separate input and output shafts 11 and 16. The interior of the housing 10 has a beveled annular portion 19 concentric with shafts 11 and 16 whose purpose will appear later in describing its relation to the other elements of structure. Fixed to that portion of the input shaft 11, within the housing 10, is a friction disk 12. Cooperating with disk 12 there are a plurality of planetary clusters made up of friction disks 13 and 14 of different diameters and joined in rigid unitary structures. One disk of each cluster has a peripheral engagement with the periphery of disk 12, with the surface 19 and with a disk 15. Disk 15 is fixed on that portion of the output shaft 16 extending within the housing 10 and has an interiorly beveled peripheral flange at 21 which provides the surface to engage the periphery of disk 14 of the cluster. The entire assembly of disks 12, 13, 14 and 15 is resiliently held in engagement by the continuous pressure of spring 17 which is interposed between the disk 15 and the wall of the housing 10. The spring 17 and the beveled surfaces 19 and 21 cooperate to compensate for wear of the contacting surfaces.

In the modification illustrated in Fig. 1 the disk 12 has a groove 18 which stabilizes the clusters of disks 13 and 14 under the pressure of spring 17. This is desirable because the axis of the cluster has no fixed connection to maintain it in alignment with the axes of the other components of the device since the cluster must be free to revolve about the disk 12 as well as to rotate on its own axis. If the groove 18 were not provided, the force from spring 17 would, for some angles of bevel for surface 19, tend to displace the cluster out of normal engagement with disk 12, or permit the planetary clusters to wander or drop out of their proper coplanar positions.

The basic operation will be described in reference to Fig. 1. When the device, as shown in Fig. 1, has a torque applied to shaft 11, the shaft 11 rotates causing the rotation of disk 12. Disk 12 then frictionally drives the planetary clusters, composed of disks 13 and 14, with the periphery of disk 13 of the cluster engaging the beveled surface 19, which is considered as fixed relative to the shaft rotation. Since the engagement of the periphery of disk 13 with the periphery of both disk 12 and the beveled surface 19 are frictional and there is no slippage, the planetary cluster is caused to rotate on its own axis and simultaneously to revolve about the disk 12. The relative movement between disk 13 and surface 19 corresponds to the movement of a wheel rolling along a flat surface. The rotation of disk 13 produces a corresponding rotation of disk 14, whose periphery frictionally engages the beveled surface of disk 15 to drive the output shaft 16. The spring 17 functions to press the several disks into engagement and to take up any wear of the parts. The desired ratio between rotations of the shafts 11 and 16 is obtained by varying the radii of the various disks whose relationship may be seen from consideration of the following formula whose terms are designated in relation to Fig. 1:

$$S = \frac{R_1 + R_4}{R_1} \left[ \frac{R_2 R_5}{R_2 R_5 - R_3 R_4} \right]$$

in which S is the ratio of the angular input to the angular output of two shafts; $R_1$ is the radius of the driving disk 12; $R_2$ is the radius of disk 13 of the planetary cluster; $R_3$ is the radius of the disk 14 of the planetary cluster; $R_4$ is the contact radius of the annular beveled surface of housing 10; and $R_5$ is the contact radius of the disk 15 of the output of the device.

The use of frictional engagement between all the moving parts eliminates the problem of backlash since the engagement is continuous whether the direction and force of the applied torque is constant or not.

Referring now to Fig. 2, which is a modification of the device as shown in Fig. 1, the parts 10 through 14 and 16 through 18 have the same function as described in Fig. 1. The disk 15 however has been replaced by a disk 15' which has an exterior beveled surface for engaging the surface of disk 14. The function of the device is the same as for Fig. 1 and the relationship set up in the formula hold for this case also.

The modification shown in Fig. 3 comprises a housing 10 and shaft 11 with a disk 12' which may have an exterior beveled surface. Engaging the periphery of disk 12' is periphery of disk 13 which is coaxially fixed to disk 14. The periphery of disk 14 engages the beveled surface of housing 10 and the exteriorly beveled surface of disk 15'. In this arrangement it is to be noted that the disk 14 is the one which engages the stationary beveled surface of housing 10. The operation of this modification is substantially the same as that of Fig. 1, described in detail above.

The present invention as disclosed in all of these figures lends itself to a cascade arrangement as shown in Fig. 4, where the modification of the invention disclosed in Fig. 1 is shown in cascade arrangement. Since all of the disk members of this invention are substantially flat they may be assembled into a very compact device, and can easily be made by stamping operations, which facilitates manufacture.

It should be understood, of course, that the foregoing disclosure relates to only a preferred embodiment of the invention and that numerous modifications or alterations may be made therein without departure from the spirit of the scope of the invention.

What is claimed is:

An anti-backlash power transmission consisting of a housing, a drive shaft and a driven shaft coaxially journaled in confronting walls of the housing, both extending into the housing, a peripherally grooved friction disk carried by the inner end of the drive shaft, a take-off friction disk carried by the inner end of the driven shaft, a fillet occupying a corner of the housing constituting a fixed annular track, being pitched at an angle away from that wall contiguous to the grooved friction disk to face the driven shaft and to situate said grooved disk within the confines of said track, a similar fillet and track embodied in the take-off friction disk, being pitched at an angle to face the drive shaft and the aforesaid contiguous wall, forming with the first-named contiguous wall and fillet a space occupied in part by the peripherally grooved friction disk, a planetary cluster of drive-transmission members also occupying said space, each of the members comprising at least a pair of two-diameter friction disks, unitarily constructed in concentric stepped formation and revoluble on axes parallel to the shaft axes, the large diameter disks thereof being bottomed in the grooved friction disk, and a spring loading on the driven shaft, putting side pressure by contact of the take-off disk fillet with the lateral rims of the small-diameter disks, in turn to cause lateral rim contact of the large-diameter disks against the housing fillet to keep the individual two-diameter disks of the planetary clusters upright and coplanar in the aforesaid space.

References Cited in the file of this patent

UNITED STATES PATENTS

| | | |
|---|---|---|
| 1,060,073 | Fono | Apr. 29, 1913 |
| 1,201,367 | Shelton | Oct. 17, 1916 |
| 1,632,212 | Baltzley | June 14, 1927 |
| 1,701,723 | Lyons | Feb. 12, 1929 |
| 1,993,051 | Dell et al. | Mar. 5, 1935 |
| 2,536,803 | Gleason | Jan. 2, 1951 |

FOREIGN PATENTS

| | | |
|---|---|---|
| 116,642 | Switzerland | Oct. 1, 1926 |
| 692,431 | France | Nov. 5, 1930 |